UNITED STATES PATENT OFFICE.

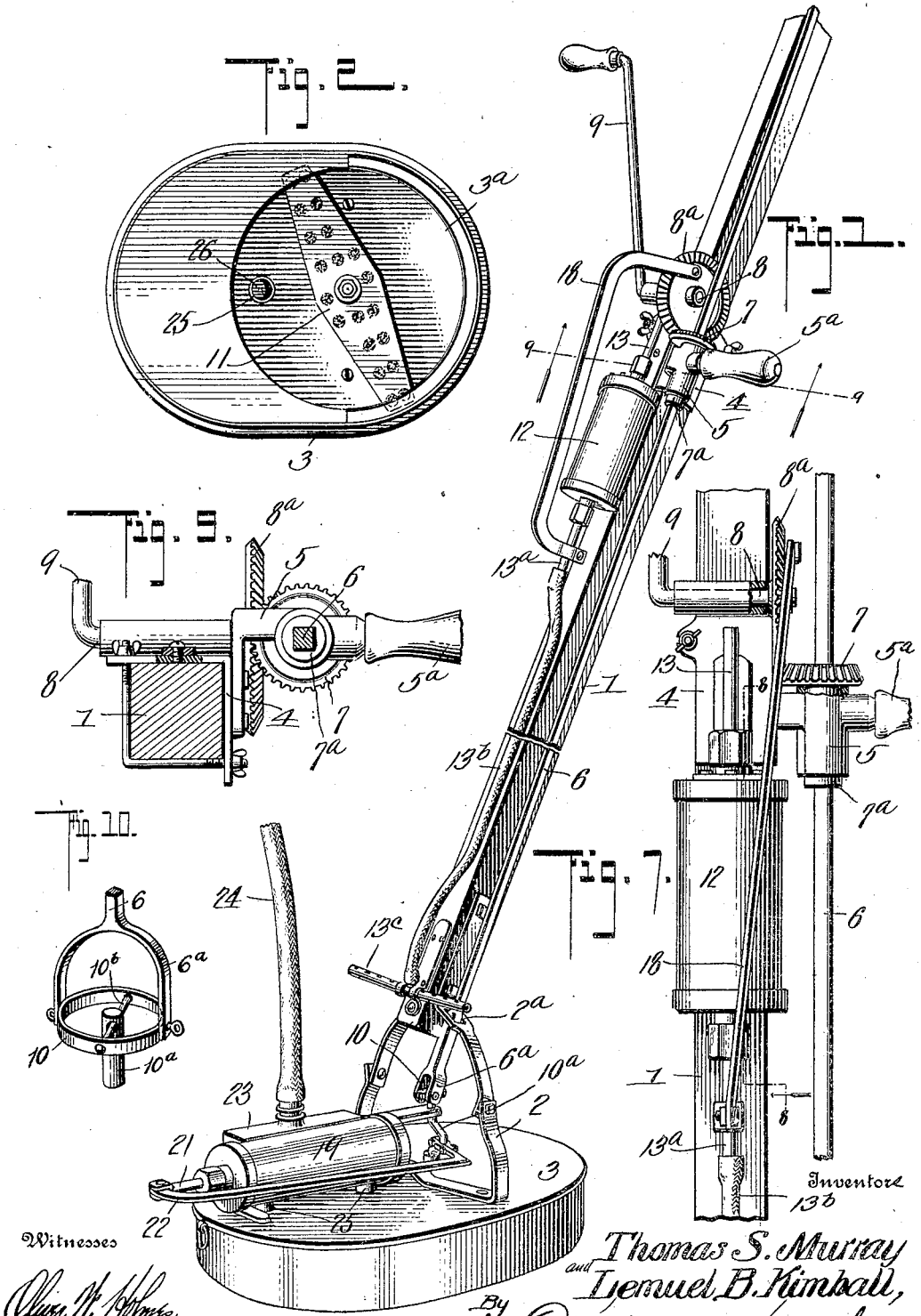

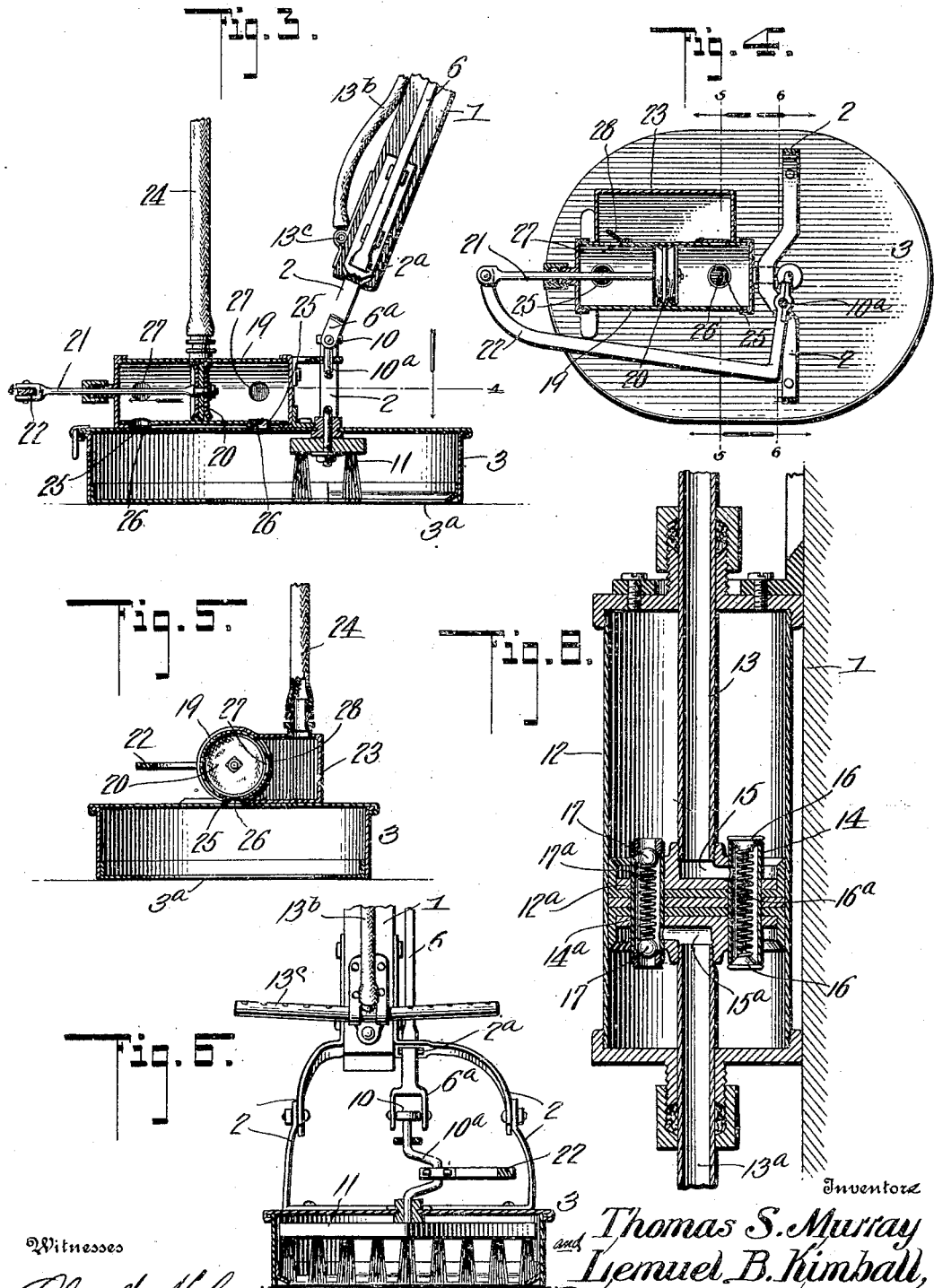

THOMAS S. MURRAY AND LEMUEL B. KIMBALL, OF ARKANSAS CITY, KANSAS.

CISTERN-CLEANER AND WATER-PURIFIER.

No. 909,314.	Specification of Letters Patent.	Patented Jan. 12, 1909.

Application filed February 11, 1908. Serial No. 415,433.

*To all whom it may concern:*

Be it known that we, THOMAS S. MURRAY and LEMUEL B. KIMBALL, citizens of the United States, residing at Arkansas City, in the county of Cowley and State of Kansas, have invented a new and useful Improvement in Cistern-Cleaners and Water-Purifiers, of which the following is a specification.

This invention relates to an improvement in cistern cleaners and water purifiers and is designed especially as an improvement upon the devices of this character for which patents were granted to Murray and Jackson, Number 715,408, and to T. S. Murray, Number 784,583.

The invention consists in the novel features of construction hereinafter described, pointed out in the claims, and shown in the accompanying drawings, in which—

Figure 1 is a perspective view of the device, partly broken away. Fig. 2 is an inverted plan view of a casing designed to rest movably upon the bottom of a cistern. Fig. 3 is a central longitudinal section through said casing and through a cylinder carried thereby, parts connected thereto being shown in elevation. Fig. 4 is a section on the line 4—4 of Fig. 3. Fig. 5 is a section on the line 5—5 of Fig. 4. Fig. 6 is a section on the line 6—6 of Fig. 4. Fig. 7 is an enlarged detail plan view of a portion of a pole with a pump and certain gearing mounted thereon, a bearing being broken away and shown partly in section. Fig. 8 is an enlarged detail sectional view on the line 8—8 of Fig. 7. Fig. 9 is an enlarged sectional view on the line 9—9 of Fig. 1. Fig. 10 is a detail perspective view of a universal joint.

In these drawings 1 represents a supporting pole which may be in sections of convenient length so that the length of the pole can be adjusted to the depth of the cistern with which it is to be used. A sectional yoke 2, the sections of which are pivoted together, connects the pole 1 with a casing 3 which casing is oval in outline and is provided with a circular opening $3^a$ in its bottom adjacent one end the other end forming a catch basin. One section of the yoke 2 is rigidly secured to the top of the casing 3 extending vertically therefrom, and the other section is secured to the lower portion of the pole 1, so that the yoke pivotally connects the pole with the casing. Upon the pole is also arranged adjacent its upper end a suitable plate 4 which is provided with a sleeve 5 to which is attached a handle $5^a$ to be grasped by the left hand of the operator for the purpose of steadying the pole. A rod 6 extends loosely through the sleeve 5 and the lower portion of said rod also passes loosely through an opening $2^a$ in a member of the yoke section secured to the pole 1 and the lower portion of said rod is bifurcated as shown at $6^a$. A gear wheel 7 is provided with an extended hub $7^a$ which is rotatably journaled in the sleeve 5 and which is fixed upon the rod 6. This is preferably accomplished by having the rod rectangular in cross section and providing a rectangular bore through the hub $7^a$. Upon the pole is also journaled a shaft 8 at right angles to the sleeve 5 and rotatably mounted in bearings also formed upon the plate 4 and this shaft carries at one end a bevel gear wheel $8^a$ which meshes with the gear wheel 7 which is also a bevel gear and at the opposite end shaft 8 carries a handle 9 so that it can be rotated by hand.

A knuckle joint is carried by the bifurcated portion $6^a$ of the rod 6, and consists of a ring 10 loosely pivoted in the bifurcation and a bolt $10^b$ passing loosely through the ring, the said bolt also passing loosely through the upper end of a vertically arranged crank shaft $10^a$ the lower end of which is fixed to a rotating brush 11 placed within the casing 3, said brush rotating about a center common to the opening $3^a$. Any articles which may be lying upon the bottom of the cistern or well and which, by reason of their weight or size, cannot be taken up and discharged in the usual manner, are pushed by rotation of the brush into the catch basin and held there, and may be removed when the cleaning device is drawn to the surface. Upon the pole is also mounted a cylinder 12 into the upper end of which extends a hollow piston rod 13 and a similar piston rod $13^a$ works through the lower head of said cylinder. A piston $12^a$ is secured to and connects the inner ends of the piston rods 13 and $13^a$ and the piston is provided with two transversely arranged sleeves 14 and $14^a$ which provide passages directly through the piston. Opposite sides of the piston are cored out thereby forming a passage 15 which connects the inner end of the piston rod 13 with the sleeve 14 and a passage $15^a$ connecting the piston rod $13^a$ with the sleeve $14^a$, the communication between the said sleeves and the piston rods being effected through the sides of the sleeves. The openings in the ends of the sleeve 14 are controlled by outwardly opening cone valves 16 secured together and normally held in their seats by a spring 16ª. Passage through the sleeve 14ª is controlled by inwardly opening ball valves 17 normally held in their seats by a spring 17ª. To the lower end of the piston 13ª is connected a flexible hose 13ᵇ the lower end of which connects with a transversely arranged and perforated pipe 13ᶜ carried adjacent the lower end of the pole. The piston 12ª is reciprocated in the cylinder 12 by an angled arm 18 one end of which is secured to the piston rod 13ª and the other end of which is eccentrically connected to the bevel gear 8ª, so that rotation of the handle 9 will cause the piston 12ª to move backward and forward within the cylinder 12, and it will be understood that the piston 13 is open at its upper end and serves as an air supply pipe for said cylinder, the cylinder constituting an air pump. Upon the casing 3 is mounted a cylinder 19 in which is arranged a piston 20 provided with a piston rod 21 which is connected by an angled arm 22 to the cranked portion of the shaft 10ª. A casing 23 is also arranged upon the casing 3 and adjacent the cylinder 19 and from the casing 23 leads a discharge pipe 24, preferably a hose, through which dirt and other sediment removed from the bottom of the cistern by rotation of the brush 11, is conveyed. Ports 25 afford communication between the end portions of the cylinder 19 and the casing and in these ports are arranged vertically movable suction valves 26, and suitable ports 27 are arranged between the sides of the cylinder 19 and the casing 23 in which are arranged check valves 28 opening from the cylinder 19 into said casing.

The operation of the device is as follows:— Upon rotation of the handle 9 the rod 6 will be rotated through the gears above mentioned, thus rotating the brush 11 and through the arm 22 and piston rod 21 reciprocating the piston 20 in the cylinder 19. Mud and sediment stirred up by the brush 11 will be drawn alternately through the ports 25 into the end portions of the cylinder 19 and movement of the piston 20 will expel the same through the ports 27 into the casing 23 from which it will be carried by the hose 24 to any desired place of deposit. Air will also be forced into the bottom of the cistern through the hose 13ᵇ and pipe 13ᶜ by action of the air pump, air entering through the piston rod 13 and passing through the sleeve 14 into the lower end of the cylinder 12, the piston being on an up stroke, and upon a down stroke the lower valve 16 will become seated and the lower ball valve 17 will open and the air previously forced into the cylinder upon the lower side of the piston will upon the downward stroke pass through the passage 15ª and through the piston rod 13ª to the hose 13ᵇ. While air is being forced from the lower portion of the piston through the passage 15ª, air will be entering the upper portion through the passage 15 and through the upper end of the sleeve 14 being admitted thereto by the lifting of the upper cone valve 16.

Having thus fully described our invention, what we claim as new and desire to secure by Letters Patent, is:—

1. A cistern cleaning device comprising a casing, said casing being of greater length than width, and having a circular opening formed in the bottom adjacent one end, a brush journaled in alinement with said opening and rotating in a horizontal plane and means for conveying to the surface semi-liquid sediment stirred by rotation of said brush, non-dischargeable objects being thrown by said brush into the opposite end of the casing.

2. A device of the kind described comprising a casing, means for causing said casing to move over the bottom of a cistern, the casing having an opening formed in its bottom adjacent one end, the other end of the casing forming a catch basin, a brush rotating in horizontal plane, said brush working in alinement with the casing opening, a crank shaft connected to the brush, a handle connected to the casing, a rotatable rod carried by the handle, means mounted on the handle for rotating said rod, a knuckle joint connecting said rod and crank shaft, and means for discharging from the casing sediment loosened by the brush, the said brush throwing into the catch basin solid matter not dischargeable.

THOMAS S. MURRAY.
LEMUEL B. KIMBALL.

Witnesses:
WILLIAM T. COPELAND,
DANIEL ASHBA.